(12) United States Patent
Hayakawa et al.

(10) Patent No.: US 7,304,392 B2
(45) Date of Patent: Dec. 4, 2007

(54) DIE FOR FORMING AN OPTICAL ELEMENT, AND PRODUCTION METHOD AS WELL AS REGENERATION METHOD OF THE SAME

(75) Inventors: Shuhei Hayakawa, Hachioji (JP); Shunichi Hayamizu, Amagasaki (JP); Kazuyuki Ogura, Yao (JP); Naoyuki Fukumoto, Amagasaki (JP)

(73) Assignee: Konica Minolta Opto, Inc. (JP)

( * ) Notice: Subject to any disclaimer, the term of this patent is extended or adjusted under 35 U.S.C. 154(b) by 0 days.

(21) Appl. No.: 11/134,954

(22) Filed: May 23, 2005

(65) Prior Publication Data
US 2005/0263806 A1   Dec. 1, 2005

(30) Foreign Application Priority Data
May 27, 2004   (JP)   ............................ 2004-158199

(51) Int. Cl.
*H01L 23/48*   (2006.01)

(52) U.S. Cl. ..................... 257/780; 257/781; 428/901

(58) Field of Classification Search ................. 264/2.5, 264/225; 249/114.1, 134; 425/808, 117; 257/780, 781; 428/901
See application file for complete search history.

(56) References Cited

U.S. PATENT DOCUMENTS
2003/0196903 A1* 10/2003 Teshima et al. ............. 205/118

FOREIGN PATENT DOCUMENTS
JP   01-192733   8/1989
JP   05-032424   2/1993

* cited by examiner

*Primary Examiner*—Thomas L. Dickey
(74) *Attorney, Agent, or Firm*—Cantor Colburn LLP

(57) ABSTRACT

A die for forming an optical element, comprising: (i) a base member having a base surface which comprises a foundation area including a die surface to form an optical surface of the optical element and a peripheral area provided around the foundation area; (ii) a first layer covering both of the foundation area and the peripheral area and removable by being dissolved in a processing solution; and (iii) a second layer covering a part of the first layer corresponding in position to the foundation area so that a remaining part of the first layer corresponding in position to the peripheral area is not covered by the second layer.

19 Claims, 5 Drawing Sheets

DIE FOR FORMING AN OPTICAL ELEMENT, AND PRODUCTION METHOD AS WELL AS REGENERATION METHOD OF THE SAME

This application is based on Japanese Patent Application No. 2004-158199 filed on May 27, 2004, in Japanese Patent Office, the entire content of which is hereby incorporated by reference.

TECHNICAL FIELD

The present invention relates to a die for forming an optical element and to a die of which surface can be regenerated without re-polishing when the die becomes unfavorable for use due to deposition of stain or formation of scratch on the outermost surface of the forming die, and the invention also relates to a production method and a regeneration method of the die.

BACKGROUND OF THE INVENTION

There have been known two methods to regenerate a die for forming a glass product, in which a re-machining process or a re-polishing process is not necessary.

In the first method, employed is a die having an interlayer containing chromium as a main component between the substrate and the surface layer of the die. When the surface of the die is deteriorated due to repeated use, the die surface is treated with a processing solution which dissolves chromium. After dissolving and peeling the interlayer as well as the surface layer, a new interlayer and a new surface layer are formed on the substrate (refer to Patent Document 1). Japanese Patent Publication Open to Public Inspection, (hereinafter referred to as JP-A) No. 1-192733

In the second method, the surface film forming a die surface prepared on a substrate is removed by etching using ion beams, followed by forming a new surface film on the substrate to obtain a new die surface (refer to Patent Document 2). JP-A No. 5-32424

In the first method, the surface layer is commonly composed of materials which are insoluble in the processing solution. The surface layer is removed because the chromium interlayer is dissolved by the chromium dissolving processing solution which soaks in through surface cracks in the surface layer. However, it is very unlikely that in the ordinary forming process, such large cracks are formed in the surface layer. Consequently, the removal of the surface layer may not occur, or even if it is removed, the etching of the interlayer may take considerably long time.

On the other hand, in the second method, the surface film of the die is etched by ion beam to be peeled off. However, it is relatively difficult to suppress degradation of the surface roughness of the die due to the ion beam. Further, the ion beam etching has an inherent demerit in that it takes a very long time to peel away the layer due to the slow etching rate.

Patent Document 1: Japanese Patent Publication Open to Public Inspection (hereinafter referred to as JP-A) No. 1-192733

Patent Document 2: JP-A No. 5-32424

SUMMARY OF THE INVENTION

An embodiment of the present invention is to provide a die for forming an optical element which enables a short time regeneration without damaging the die surface of the base member, and to provide a production method and a regeneration method of the die.

One of the aspects of the present invention is a die for forming an optical element, containing: (i) a base member having a base surface which comprises a foundation area including a die surface to form an optical surface of the optical element and a peripheral area provided around the foundation area; (ii) a first layer covering both of the foundation area and the peripheral area and removable by being dissolved in a processing solution; and (iii) a second layer covering a part of the first layer corresponding in position to the foundation area so that a remaining part of the first layer corresponding in position to the peripheral area is not covered by the second layer.

BRIEF DESCRIPTION OF THE DRAWINGS

Embodiments will now be described, by way of example only, with reference to the accompanying drawings which are meant to be exemplary, not limiting, and wherein like elements are numbered alike in several FIGS., in which.

DESCRIPTION OF THE PREFERRED EMBODIMENT

Figure 1:
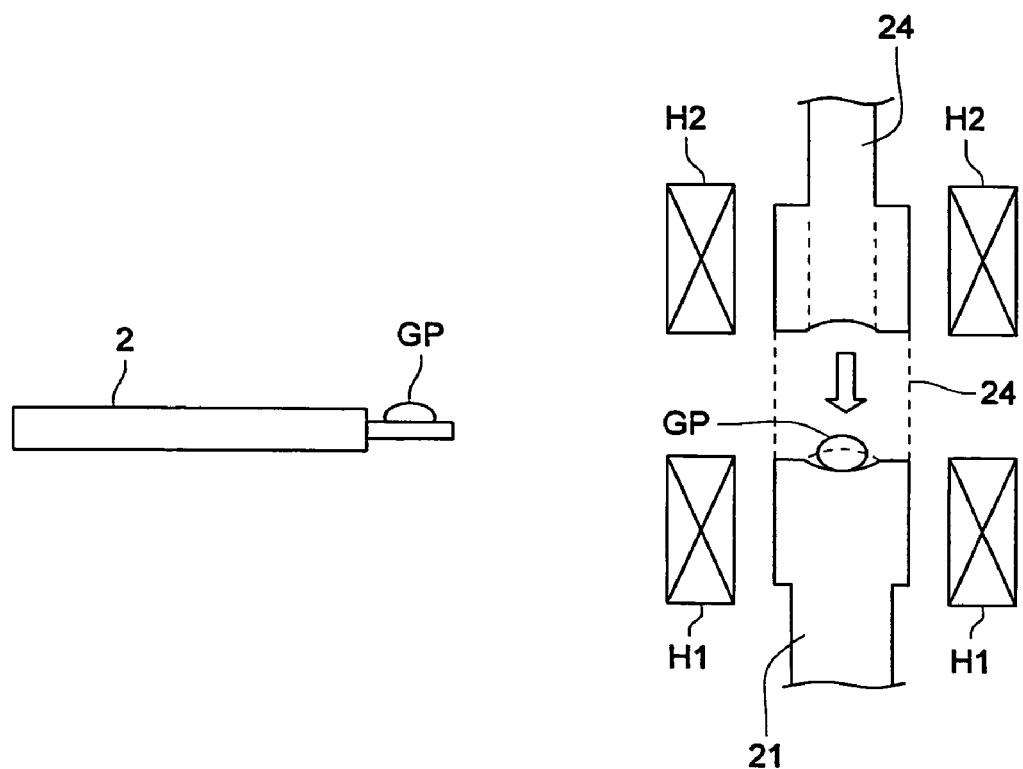
FIG. 1 is a front view showing the structure of a lens forming apparatus employing the die for forming an optical element.

In order to overcome the above described problems, the die for forming an optical element of the present invention is formed employing (a) a base member having a base surface which comprises a foundation area including a die surface to form an optical surface of the optical element and a peripheral area provided around the foundation area, (b) a first layer covering both of the foundation area and the peripheral area and removable by being dissolved in a processing solution (hereafter, the area including the above foundation area and the peripheral area is denoted as "the first area", and the area corresponding to the foundation area is denoted as "the second area"), and (c) a second layer covering a part of the first layer corresponding in position to the foundation area (the second area) so that a remaining part of the first layer corresponding in position to the peripheral area is not covered by the second layer.

In the above described die for forming an optical element, the second layer is formed in the second area which covers the die surface of the base member through the first layer, and a part of the surface of the first layer in the peripheral area is left uncovered. Accordingly, when the die is treated with the processing solution to regenerate the die, dissolution of the first layer proceeds fast, especially during the initial stage, resulting in accelerating the entire dissolution of the first layer. Also, peeling of the second layer provided on the first layer proceeds fast, and the die surface of the base member can be exposed in a short time without damage. Thus, a quick and accurate regeneration of the optical element forming die becomes possible.

In one of the specific embodiments of the present invention on the die for forming an optical element, the second area in which the second layer is formed, is provided narrower than the first area while completely covering the die surface of the base member. Accordingly, the peripheral area of the first layer is partially left uncovered while the die surface is protected by being covered by the second layer.

Further, in another one of the specific embodiments of the present invention, the base member contains of at least one of silicon carbide, silicon nitride, silicon oxide, super-hard stainless steel, and cermet. By using these materials, it is possible to obtain a base member exhibiting excellent hardness and heat resistance, as well as to extend the working life of the die.

Further, in one of the specific embodiments of the present invention, the first layer is a film which is soluble in acids or alkalis. Accordingly, it is possible to readily dissolve the first layer employing a processing solution containing an acid or an alkali which are easy to purchase or handle.

Further, in one of the specific embodiments of the present invention, the second layer is a noble metal film containing, as a main component, at least one of Au, Ag, Ir, Re, Os, Pd, Rh, Ru, or Pt. These materials are preferable for obtaining a die exhibiting minimal degradation of the forming surface, a favorable forming property and a satisfactory releasing property.

Further, in one of the specific embodiments of the present invention, the thickness of the first layer is 0.05-20 μm, by which the second layer is steadily supported by the first layer while easily removed by the quick dissolution of the first layer when treated with the processing solution.

Further, in one of the specific embodiments of the present invention, the thickness of the second layer is 0.05-20 μm, by which a stable formation of an optical element is possible over a long period of time.

Further, in another specific embodiment of the present invention, either the first layer or the second layer is a film formed by any one of sputtering, CVD, vacuum evaporation, and ion plating methods.

Further, in one of the specific embodiments of the present invention, a layer containing at least one of the elements contained in the first layer and at least one of the elements contained in the second layer, is provided between the first layer and the second layer, by which a strong adhesion between the first layer and the second layer is attained and the second layer tends not to be peeled while optical elements are repeatedly formed.

Further, in one of the specific embodiments of the present invention, a third layer which is insoluble in the processing solution of the first layer is provided between the forming surface of the base member and the first layer, by which erosion of the base member by the processing solution is certainly prevented.

Further, in one of the specific embodiments of the present invention, at least one of a metal nitride, carbide, or oxide, as well as ceramics is employed as a main component of the third layer, by which the durability of the third layer against the processing solution is assured.

Further, the production method of the die for forming an optical element according to the present invention comprising (a) forming a base member having a base surface which contains a foundation area including a die surface to form an optical surface of the optical element and a peripheral area provided around the foundation area; (b) forming a first layer in both of the foundation area and the peripheral area of the base surface (the first area), the first layer being removable by being dissolved in a processing solution; and
  (c) forming a second layer on a part of the first layer corresponding in a position to the foundation area (the second area) so that a remaining part of the first layer corresponding in position to the peripheral area is not covered by the second layer.

In the above described production method of a die for forming an optical element, the second layer is formed in the second area which covers the die surface of the base member through the first layer, and a part of the surface of the first layer in the peripheral area is left uncovered. Accordingly, when the die is treated with the processing solution to regenerate the die, dissolution of the first layer proceeds fast, especially during the initial stage, resulting in accelerating the entire dissolution of the first layer. Also, peeling of the second layer provided on the first layer proceeds fast, and the die surface of the base member can be exposed in a short time without damage. Thus, a quick and accurate regeneration of the optical element forming die becomes possible.

Further, in one of the specific embodiments of the present invention, in the described production method of the die, the second area in which the second layer is provided, is provided within the first area while the second area completely covers the die surface of the base member.

Further, in one of the specific embodiments of the present invention, the second layer is formed in the second area narrower than the first area by masking the peripheral area of the first area.

Further, in one of the specific embodiments, the base member contains at least one of silicon carbide, silicon nitride, silicon oxide, super-hard stainless steel, or cermet as a main component.

Further, in one of the specific embodiments, the first layer is soluble in an acid solution or in an alkali solution.

Further, in one of the specific embodiments of the present invention, the second layer is a film of noble metal which contains at least one of Au, Ag, Ir, Re, Os, Pd, Rh, Ru, or Pt as a main component.

Further, in one of the specific embodiments of the present invention, the thickness of the first layer is 0.05 to 20 μm.

Further, in one of the specific embodiments of the present invention, the thickness of the second layer is 0.05 to 20 μm.

Further, in one of the specific embodiments of the present invention, at least one of the first layer and the second layer is a film formed by employing sputtering, CVD, vacuum evaporation, or ion plating.

Further, in one of the specific embodiments of the present invention, a mixed layer containing at least one of the elements constituting the first layer and at least one of the elements constituting the second layer is formed between the first layer and the second layer.

Further, in one of the specific embodiments of the present invention, a third layer, insoluble in the etching solution of the second layer, is provided under the first layer.

Further, in one of the specific embodiments of the present invention, the third layer contains at least one of a metal nitride, a metal carbide, a metal oxide, or a ceramic as a main component.

Further, one of the specific embodiments of the present invention is a regeneration method of a die for forming an optical element containing (i) a base member having a base surface which comprises a foundation area including a die surface to form an optical surface of the optical element and a peripheral area provided around the foundation area; (ii) a first layer covering both of the foundation area and the peripheral area (the first area) and removable by being dissolved in a processing solution; and (iii) a second layer covering a part of the first layer corresponding in position to the foundation area (the second area) so that a remaining part of the first layer corresponding in position to the peripheral area is not covered by the second layer. The regeneration method contains the steps of (a) removing the first layer and the second layer by dissolving the first layer using the processing solution; (b) washing the base member; (c) providing the first layer in the first area; and (d) providing the second layer on a part of the first layer corresponding to the second area.

In the above regeneration methods of the die, when the die is treated with the processing solution, dissolution of the first layer proceeds fast, especially during the initial stage, resulting in accelerating the entire dissolution of the first layer. Also, peeling of the second layer provided on the first layer proceeds fast, and the die surface of the base member can be exposed in a short time without damage. Thus, a quick and accurate regeneration of the optical element forming die becomes possible.

Further, in one of the specific embodiments of the present invention, in the described regeneration method of the forming die, after cleaning of the base member, the die shape as well as the die surface is inspected, by which the regeneration of the die is more assuredly performed. If the shape of the die surface is not degraded, without any treatment, the first layer and the second layer may successively be formed. On the other hand, if the shape of the die surface is degraded, regeneration processing such as polishing is performed, and a new first layer and a new second layer are successively formed.

Further, in one of the specific embodiments of the present invention, the solution which is employed to treat the first layer is either an acid or an alkali.

Further, in one of the specific embodiments of the present invention, the solution employed to treat the first layer is brought into contact with the outside of the second area while being in the range of the first area.

FIG. 1 is a front view illustrating the structure of a lens forming apparatus employing the die for forming an optical element according to one of the embodiment of the present invention.

Lens forming apparatus 10 is provided with (i) feeding unit 2 which conveys and feeds glass preform GP heated to a specified temperature, which is to be forming into a lens material; (ii) lower die 21 maintained at an appropriate temperature employing heaters H1; and (iii) upper die 24 maintained at an appropriate temperature employing heaters H2. Herein, both lower die 21 and upper die 24 are optical element forming dies to form glass lenses which will be used as a light source element. Of these, upper die 24 travels up and down employing a driving mechanism which is not shown. When feeding device 2 places glass preform GP, maintained at a proper temperature, onto lower die 21, upper die 24 moves down and engages with lower die 21. The glass preform GP interposed between dies 21 and 24 is formed into a glass lens by pressing, and gradually cooled, whereby a final lens product is obtained.

Figure 2A:
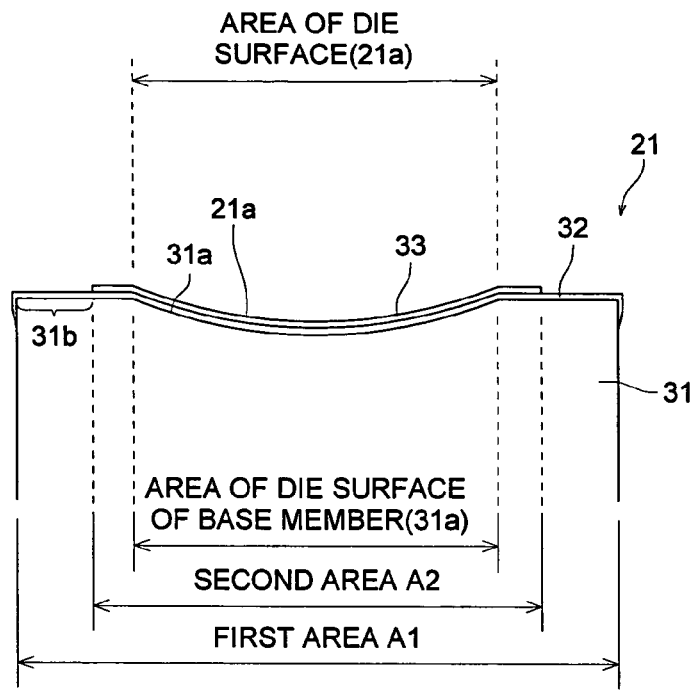
FIG. 2(a) is a conceptual view showing the sectional structure of a lower die.
Figure 2B:
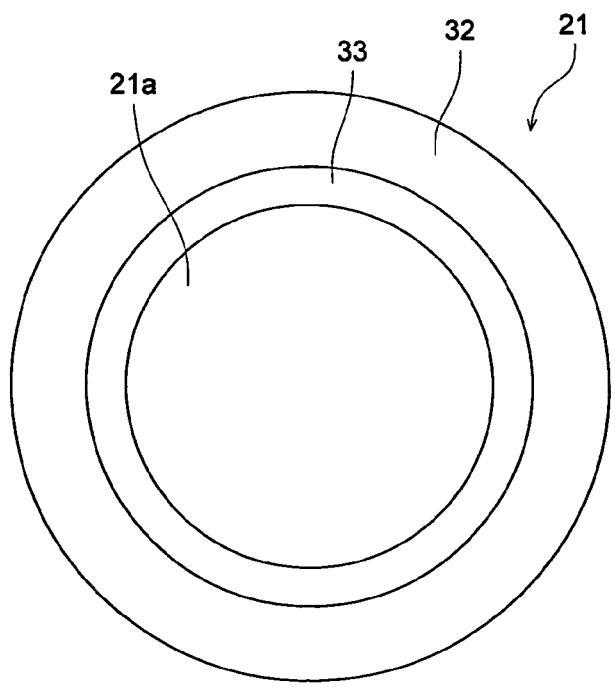
FIG. 2(b) is a conceptual view showing the plan structure of the lower die.

FIG. 2(a) is a sectional view, conceptually describing the structure of lower die 21, while FIG. 2(b) is a plan view, conceptually describing the same. Lower die 21 contains (i) base member 31 provided with die surface of the base member 31a; (ii) dissolvable layer 32 which is "the first layer" formed on die surface 31a, and (iii) protective layer 33 which is "the second layer" formed on dissolvable layer 32.

Herein, base member 31 contains die surface 31a in the central section and also contains ring-shaped flange area 31b in the peripheral of die surface of 31a. This base member 31 is formed employing, for example, silicon carbide (SiC), while it may also be formed employing other materials such as tungsten carbide (WC), alumina ($Al_2O_3$), silicon nitride (SiN), silicon oxide ($SiO_2$), ultra-hard stainless steel, or cermet. Further, a small amount of additives may be used. Of these, silicon carbide is excellent in view of hardness and thermal stability, and preferably used as a material for base member 31.

Dissolvable layer 32, designated as "the first layer", is formed on the first area A1 including die surface 31a and flange area 31b, namely the entire area of the upper surface of base member 31. Dissolvable layer 32 contains, for example, chromium as a main component, and the layer is formed by employing any one of a sputtering method, a vacuum evaporation method, a CVD method and an ion plating method. The surface of dissolvable layer 32 remains uncovered in flange area 31b. Accordingly, it is rapidly dissolved in a chromium dissolving processing solution and assuredly removed from the surface of die surface 31a of base member 31. Namely, the chromium dissolving processing solution exhibits extremely high etching capability on dissolvable layer 32, compared to base member 31, whereby dissolvable layer 32 is completely removed after etching, and the die surface 31a suffers from almost no damage. For example, suitably employed as the chromium dissolving processing solution is a diammonium cerium nitrate solution. Alternatively, also employed as dissolvable layer 32 may be other metal materials such as Pt, and various types of acids or alkalis including hydrochloric acid and aqua regia may be used instead of a chromium dissolving solution for dissolution and removal of dissolvable layer 32.

Further, protective layer 33 (the second layer), designated as "the second layer", is formed on dissolvable layer 32 (the first layer) in the second area A2 which is narrower than the first area A1, resulting in partially remaining the dissolvable layer 32 uncovered in the flange area 31b. Die surface 21a is a transfer surface having a surface shape corresponding to die surface 31a. Protective layer 33 is a noble metal film composed of an alloy, for example, Pt and Ir. Protective layer 33 may also be formed employing materials such as Au, Ag, Re, Os, Pd, Rh, and Ru. Further, alloys of these metals may also be applicable and these materials may be added to other materials as an additive. Protective layer 33 is formed employing any one of a sputtering method, a vacuum evaporations method, a CVD method and an ion plating method. By providing above described protective layer 33, the die surface is easily transferred to a lens surface while degradation of die surface 21a is suppressed and desired molding and releasing properties are obtained.

In the case of lower die 21 shown in FIG. 2, as noted above, dissolvable layer 32 is exposed in flange section 31b, whereby it is possible to quickly proceed with dissolution on this exposed portion. Namely, in the case in which base member 31 is immersed in a processing solution, dissolution of dissolvable layer 32 is accelerated, particularly during the initial stage. Further, dissolution of the entire dissolvable layer 32 is subsequently accelerated due to effects of the initial stage. Due to that, peeling away of protective layer 33 on dissolvable layer 32 is quickly performed, and it is possible to expose die surface 31a without damaging the same, whereby it is possible to achieve quick and accurate regeneration of lower dye 21.

The above description is made for lower die 21. It is possible to make the structure of upper die 24 the same as above and to allow it to exhibit the same functions.

Regeneration of lower die 21 shown in FIG. 2 will now be described. When the lens forming apparatus, as shown in FIG. 1, is continually operated, lower die 21 is gradually degraded due to repeated use. In practice, fog is generated on the lens surface of glass lenses formed by lens forming apparatus 10, whereby optical characteristics of the resulting glass lenses are gradually degraded. It is possible to renew the forming surface of lower die 21, degraded as above, employing the following process.

Specifically, lower die 21 is removed from lens forming apparatus 10, and its die surface side is immersed into a processing solution such as a processing solution for chromium-dissolution. By so doing, as noted above, the processing solution quickly dissolves dissolvable layer 32 from its periphery. Namely, dissolvable layer 32 as well as protective layer 33 is quickly removed, and die surface 31a of base member 31 is exposed. Subsequently, the processing solution adhered to base member 31 is removed via washing and a film composed of Cr as a main component is formed on the dried die surface 31a employing a sputtering method, whereby dissolvable layer 32 is formed. The thickness of dissolvable layer 32 is controlled to be about 0.05 to about 20 μm. Subsequently, a noble metal film, composed for example, of Pt, Ir, or Au as a component is formed on resulting dissolvable layer 32, employing a method such as a sputtering method, whereby a new protective layer is formed. The thickness of protective layer 33 is controlled to be about 0.05- about 20 μm. Employing the above operations, regeneration of lower die 21 is completed, whereby surface 21a of lower die 21 is regenerated to the state of the die surface shown in FIG. 2. In the above regeneration process, when the thickness of dissolvable layer 32 is less than 0.05 μm, its function is not sufficiently exhibited, while when its thickness is more than 20 μm, the optical surface, being the die surface, tends to be subjected to shape deformation. Further when the thickness of the protective layer 33 is less than 0.05 μm, its desired function is not sufficiently exhibited, while its thickness is more than 20 μm, the optical surface tends to vary in shape.

Figure 3:
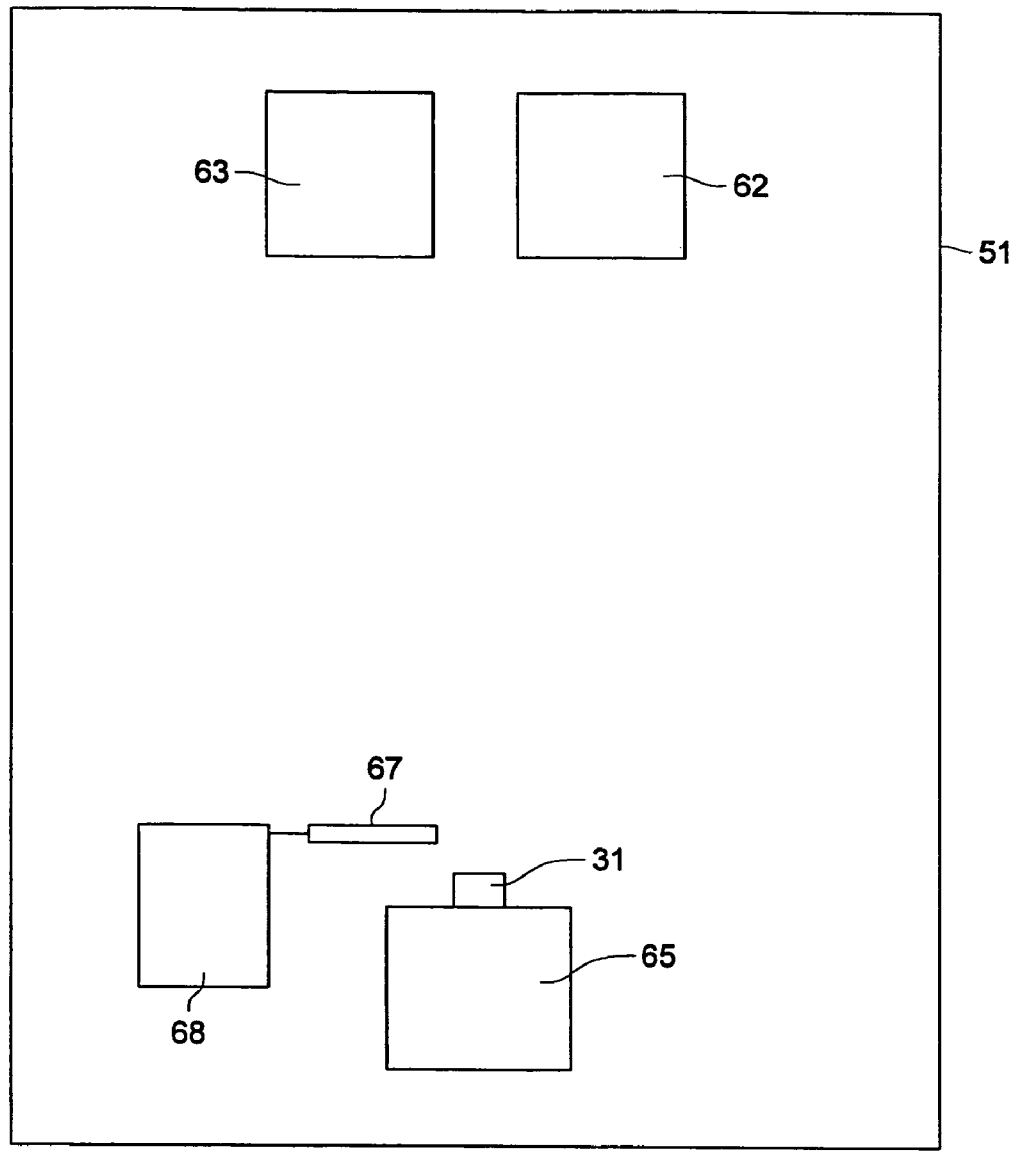
FIG. 3 is a block diagram showing the structure of a film forming apparatus to form a dissolvable layer and a protective layer on the base member during regeneration.

FIG. 3 is a block diagram describing the structure of filming apparatus 50 which forms dissolvable layer 32 as well as protective layer 33 on base member 31 after the process employing a processing solution.

Film forming apparatus 50 is a magnetron sputter type apparatus and has a structure in which in vacuum vessel 51, provided are paired target units 62 and 63, holder 65 which holds base member 31 after the peeling process which peels away both covering layers 32 and 33, mask 67 which reciprocates to the appropriate position above holder 65, and mask driving unit 68 which allows mask 67 to reciprocate at synchronized timing. Herein, first target unit 62 is provided with a target composed of metal materials, such as Cr, which are materials which constitutes dissolvable layer 32. In addition, second target unit 63 is provided with a target composed of metal materials, such as Pt, which are materials constituting protective layer 33.

During film formation, initially, mask 67 is withdrawn to a sheltered position, and simultaneously, first target unit 62 is driven, whereby a thin film, shown in FIG. 2, which is to be employed as dissolvable layer 32, is formed on the upper surface of base member 31 supported by holder 65. Subsequently, mask 67 is moved to the operation position, and simultaneously, second target unit 63 is operated, whereby a thin layer, which is to be used as protective layer 33, shown in FIG. 2 on the upper surface of base member 31, which has been covered with dissolvable layer 32. During this operation, since mask 67 has an opening corresponding to second area A2, it is possible to allow dissolvable layer 32 to be exposed on the periphery of protective layer 33.

In the above description, during film formation of dissolvable layer 32, mask 67 is moved to the sheltered position. However, it is possible to arrange another mask having an opening greater than mask 67 above base member 31, whereby it is possible to perform film formation in such a manner that dissolvable layer 32 is outside of the peripheral portion of protective layer 33.

Regeneration of lower die 21 was described above, but needles to say, regeneration of upper die 24 is performed in the same manner. Further, regeneration is described above, but it is also possible to apply the same techniques to production of lower die 21. Namely, base member 31 is produced employing techniques such as calcinating and grinding, followed by polishing, whereby die surface 31a is produced. Thereafter, by employing film formation unit 50 in FIG. 3, dissolvable layer 32 and protective layer 33 may successively be applied onto base member 31.

Figure 4:
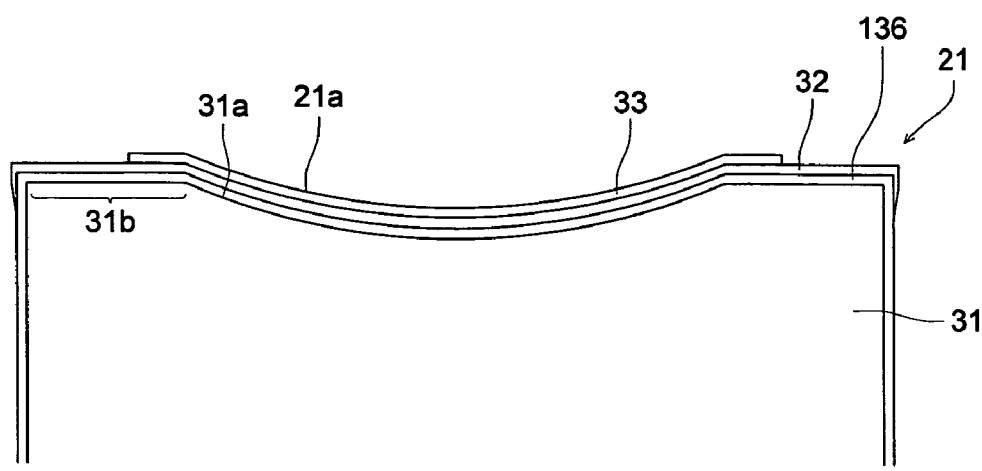
FIG. 4 is a sectional view sowing modification of the lower die.

FIG. 4 is a sectional view showing a modifed example of lower die 21 shown in FIG. 2. Blocking layer 136 is formed on the surface above base member 31 of lower die 21, namely on die surface 31a and its peripheral surface. Namely, blocking layer 136, being the third layer, is inserted between die surface 31a and dissolvable layer 32, whereby it is possible to ensure minimal erosion of die surface 31a due to the chromium-dissolving processing solution. Blocking layer 136 may be formed employing, for example, metal nitrides such as chromium nitride, but may also be formed employing other materials such as carbides, oxides, or ceramics. Further, a small amount of other components may be added to these materials. Blocking layer 136 may be formed employing, for example, sputtering or CVD. The resulting thickness is controlled to be about 0.05-20 μm. When the thickness of blocking layer 136 is less than 0.05 μm, it does not exhibit its desired functions, while when its thickness is more than 20 μm, the resulting optical surface, being the die surface, tends to vary in shape.

Figure 5:
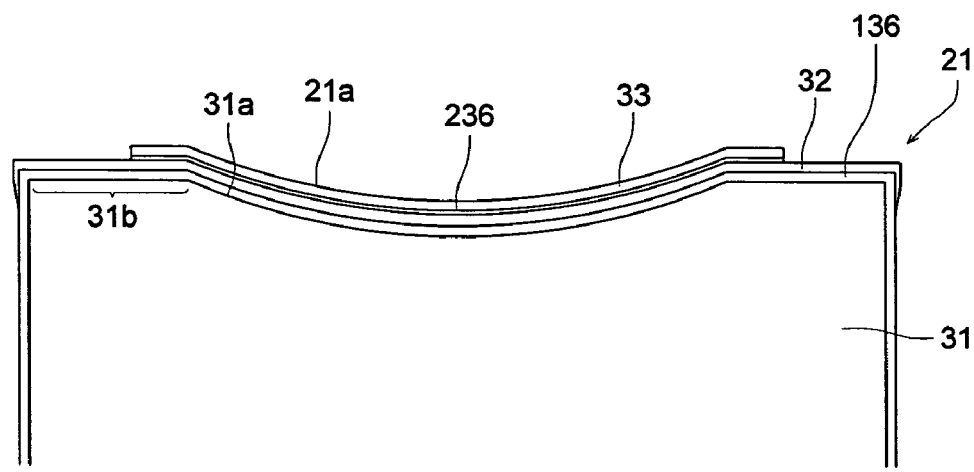
FIG. 5 is a sectional view showing another modification of the lower die.

FIG. 5 is a sectional view showing another modified example of lower die 21, shown in FIG. 2. Mixed layer 236 is formed between dissolvable layer 32 and protective layer 33, both laminated onto base member 31 of lower die 21. This mixed layer 236 may be composed of alloys of metals such as Cr constituting dissolvable layer 33 as well as metals such as Pt constituting protective layer 33. It is possible to form mixed layer 236 employing an independent process utilizing, for example, sputtering, but it is also possible to form the same in such a manner that formation of dissolvable layer 32 and protective layer 33 is performed in steps. Since the degree of contact of dissolvable layer 32 with protective layer 33 is enhanced due to the presence of above mixed layer 326, protective layer 33 is not easily peeled away even though forming is repeated.

Figure 6:
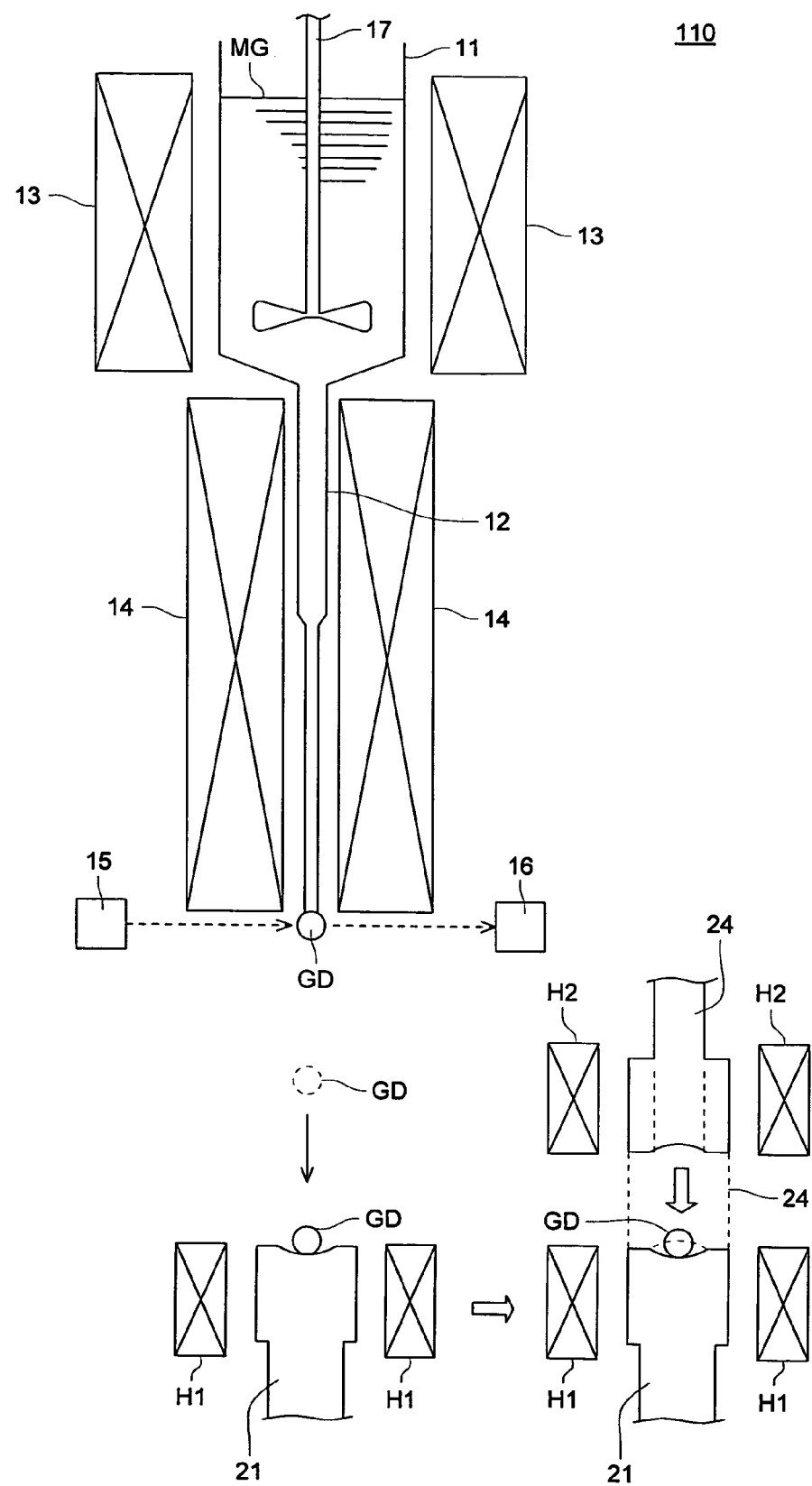
FIG. 6 is a sectional view showing modification of the lens forming apparatus shown in FIG. 1.

FIG. 6 is a sectional view showing a modified example of lens forming apparatus 10 shown in FIG. 1. Lens forming apparatus 110 is provided with glass fusing crucible 11, nozzle 12 extended from the bottom of crucible 11, heaters 13 and 14 which heat crucible 11 and nozzle 12, and observation units 15 and 16 to optically observe glass droplet GD at the tip of nozzle 12. Further, lower die 21, which receives glass droplet GD, is arranged under nozzle 12 and is maintained at the required temperature employing heathers H1. Melted glass MG in crucible 11 is heated by heater 13 and uniformly blended employing stirring rod 17. By suitably setting the temperature of heaters 13 and 14, it is possible to appropriately control the size and dropping frequency of glass droplet GD dripped from the lower end of nozzle 12. During this operation, employing observation units 15 and 16, the size and state of glass droplet GD formed at the end of nozzle 12 is observed in real time.

Movable lower die 21 is arranged in the horizontal direction, employing a driving mechanism which is not shown, is moved from the receiving position directly under nozzle 12, shown in press position directly under upper die 24, and then held. Upper die 24 is maintained at the required temperature employing heater H2 and is vertically movable, employing a driving mechanism which is not shown. When lower die 21, which has received block-shaped glass droplet GD in the receiving position, moves to the press position, upper die 24 descends and engages with lower die 21. Glass droplet GD interposed between both dies 21 and 24 is modified into a glass lens via pressure, and finished into a final product while gradually cooled.

EXAMPLES

Specific examples will now be described. Base member 31 composed of at least one of silicon carbide (SiC), tungsten carbide (WC), alumina ($Al_2O_3$), and silicon nitride (SiN) was prepared, and die surface 31a, corresponding to the optical surface was formed. In base member 31, φ8 mm masking was performed in such a manner that die surface 31a and first area A1 which extended to the periphery was exposed, and 0.2 μm thick dissolvable layer 32 composed of Cr or Pt was formed employing a magnetron sputtering method. Subsequently, in base member 31, φ5 mm masking was performed so that second area A2, which was narrower than first area A1 was exposed, and 0.2 μm thick protective layer 33 composed of a Pt—Ir alloy was formed, employing a magnetron sputtering method. By so doing, lower die 21 of Examples 1-8 was formed and corresponding upper die 24 was also produced employing the same process.

In cases of Examples 2-4, described below, in the stage prior to forming of dissolvable layer 32, blocking layer 136 was formed over the entire upper surface of base member 31. Specifically, using φ10 mm masking, blocking layer 136 composed of SiC or CrN was formed on base member 31, employing a magnetron sputtering method. Further, in each example, 0.05 μm thick mixed layer composed of mixtures of dissolvable layer 32 and protective layer 33 was formed between these two layers.

Comparative Examples 1-8 have the same structure as lower die 21 and upper die 24 of Examples 1-8, except that the film forming area of protective layer 33 was the same as that of dissolvable layer 32. Namely, film forming was performed on base member 31 employing φ5 mm masking so that the film forming of protective layer 33 was the same as dissolvable layer 32.

Utilizing each of the dies of Examples 1-8 and Comparative Examples 1-8, a 3,000-shot glass forming test was performed. After such glass forming, a processing solution for dissolution such as a diammonium cerium nitrate solution, hydrochloric acid, or aqua regia was dripped on the exposed surface of dissolvable layer 32 of lower die 21, and dissolution of dissolvable layer 32 and peeling treatment of protective layer 33 were performed. After such peeling treatment, dissolving compounds were washed away and the shape of die surface 31a was observed employing a three-dimensional determination instrument (UA3P, produced by Matsushita Electric Industrial Co., Ltd.). Table 1 shows the results. In table 1, evaluation was carried out according to the following criteria.

TABLE 1

| | Substrate Member | Protective Layer | Dissolvable Layer | Blocking Layer | Processing Solution | Processing Time | Die Surface Shape and Surface Roughness after Peeling | Evaluation |
|---|---|---|---|---|---|---|---|---|
| Example 1 | WC | PtIr | Cr | none | *1 | 1 minute | no problems | A |
| Example 2 | WC | PtIr | Cr | SiC | *1 | 1 minute | no problems | A |
| Example 3 | WC | PtIr | Cr | SiC | *2 | 20 minutes | no problems | B |
| Example 4 | WC | PtIr | Pt | CrN | *3 | 20 minutes | no problems | B |
| Example 5 | SiC | PtIr | Cr | none | *1 | 1 minute | no problems | A |
| Example 6 | SiC | PtIr | Cr | none | *2 | 20 minutes | no problems | B |
| Example 7 | $Al_2O_3$ | PtIr | Cr | none | *1 | 1 minute | no problems | A |
| Example 8 | SiN | PtIr | Cr | none | *1 | 1 minute | no problems | A |
| Comparative Example 1 | WC | PtIr | Cr | none | *1 | 60 minutes | *4 | D |
| Comparative Example 2 | WC | PtIr | Cr | SiC | *1 | 90 minutes | no problems | C |
| Comparative Example 3 | WC | PtIr | Cr | SiC | *2 | 120 minutes | peeling not possible | D |
| Comparative Example 4 | WC | PtIr | Pt | CrN | *3 | 120 minutes | peeling not possible | D |
| Comparative Example 5 | SiC | PtIr | Cr | none | *1 | 90 minutes | no problems | C |
| Comparative Example 6 | SiC | PtIr | Cr | none | *2 | 120 minutes | peeling not possible | D |
| Comparative Example 7 | $Al_2O_3$ | PtIr | Cr | none | *1 | 90 minutes | no problems | C |
| Comparative Example 8 | SiN | PtIr | Cr | none | *1 | 90 minutes | no problems | C |

*1: diammonium cerium nitrate solution
*2: hydrochloric acid
*3: aqua regia
*4: generation of roughness on WC die surface
*Example: protective layer surface area < dissolvable layer surface area (protective layer φ5 mm, dissolvable layer φ8 mm, and blocking layer φ10 mm)
*Comparative Example: dissolvable layer surface area = protective layer surface area (dissolvable layer φ5 mm, protective layer φ5 mm, and blocking layer φ10 mm)
A: No problem was observed on the die after dissolution of the layers and peeling was carried out within 1 minute.
B: No problem was observed on the die after dissolution of the layers and peeling was carried out within 20 minute.
C: No problem was observed on the die after dissolution of the layers and peeling was carried out within 60 minute.
D: Problems were found in peeling process or peeling was unsuccessful.

For example, when Example 1 and Comparative Example 1 are compared, in Comparative Example 1, protective layer was peeled away by the treatment solution, while requiring a very long time of 90 minutes, and in addition, even die surface 31a was eroded by the compounds for dissolution, whereby it was not possible to reuse base member 31. On the other hand, in Example 1, die surface 31a was not eroded by the compounds due to shortened processing time, whereby highly accurate regeneration of base member 31 was achieved. When other examples were compared, it was clear that examples are superior to each of the corresponding comparative examples in terms of processing time, the surface shape after the processing and the roughness. Incidentally, it was possible to reuse the die of each example in such a manner that after peeling protective layer 33 from die surface 31a, dissolvable layer 32 and protective layer 33 are newly provided.

While the preferred embodiments of the present invention have been described using specific terms, such description is for illustrative purposes only, and it is to be understood that changes and variations may be made without departing from the spirit or scope of the appended claims.

What is claimed is:

1. A die for forming an optical element having an optical surface area of a predetermined shape, comprising:
   (i) a base member having a base surface which comprises a foundation area including a die surface area corresponding to the optical surface area of the optical element and a peripheral area provided to enclose around the foundation area;
   (ii) a first layer covering both of the foundation area and the peripheral area and removable by being dissolved in a processing solution; and
   (iii) a second layer covering a part of the first layer corresponding in position to the foundation area so that a remaining part of the first layer corresponding in position to the peripheral area is not covered by the second layer; and
   (iv) a third layer which is insoluble in the processing solution of the first layer between the die surface area of the base member and the first layer.

2. The die of claim 1, wherein the base member contains at least one of silicon carbide, silicon nitride, silicon oxide, super hard stainless steel and cermet as a main component.

3. The die of claim 1, wherein the first layer is soluble in an acid solution or in an alkaline solution.

4. The die of claim 1, wherein
   the second layer contains at least one of Au, Ag, Ir, Re, Os, Pd, Rh, Ru, or Pt as a main component.

5. The die of claim 1, wherein a thickness of the first layer is 0.05 to 20 μm.

6. The die of claim 1, wherein a thickness of the second layer is 0.05 to 20 μm.

7. The die of claim 1, wherein at least one of the first layer and the second layer is formed by one of a sputtering method, a CVD method, a vacuum evaporation method and an ion plating method.

8. The die of claim 1 further comprising a layer containing at least one of the elements contained in the first layer and at least one of the elements contained in the second layer, the layer being provided between the first layer and the second layer.

9. The die of claim 1 wherein the third layer contains at least one of a metal nitride, a metal carbide, a metal oxide and a ceramic as a main component.

10. A method for producing a die for an optical element comprising:
    (i) forming a base member having a base surface which comprises a foundation area including a die surface to form an optical surface of the optical element and a peripheral area provided around the foundation area;
    (ii) forming a first layer in both of the foundation area and the peripheral area of the base surface, the first layer being removable by being dissolved in a processing solution; and
    (iii) forming a second layer on a part of the first layer corresponding in position to the foundation area so that a remaining part of the first layer corresponding in position to the peripheral area is not covered by the second layer
    (iv) forming a third layer between the die surface area of the base member and the first layer, wherein the third layer is insoluble in the processing solution for the first layer.

11. The method of claim 10, wherein the second layer is formed in the foundation area by masking a part of the first layer in the peripheral area.

12. The method of claim 10, wherein the base member contains at least one of silicon carbide, silicon nitride, silicon oxide, super hard stainless steel and cermet as a main component.

13. The method of claim 10, wherein the first layer is soluble in an acid solution or in an alkaline solution.

14. The method of claim 10, wherein the second layer contains at least one of Au, Ag, Ir, Re, Os, Pd, Rh, Ru, or Pt as a main component.

15. The method of claim 10, wherein a thickness of the first layer is 0.05 to 20 μm.

16. The method of claim 10, wherein a thickness of the second layer is 0.05 to 20 μm.

17. The method of claim 10, wherein at least one of the first layer and the second layer is formed by one of a sputtering method, a CVD method, a vacuum evaporation method and an ion plating method.

18. The method of claim 10 further comprising producing a layer containing at least one of the elements contained in the first layer and at least one of the elements contained in the second layer, the layer being provided between the first layer and the second layer.

19. The method of claim 10, wherein the third layer contains at least one of a metal nitride, a metal carbide, a metal oxide and a ceramic as a main component.

* * * * *